United States Patent
Oh et al.

(10) Patent No.: US 11,031,588 B2
(45) Date of Patent: Jun. 8, 2021

(54) SILICON-BASED COMPOSITE ANODE ACTIVE MATERIAL FOR SECONDARY BATTERY, ANODE COMPRISING SAME

(71) Applicants: Hyundai Motor Company, Seoul (KR); Kia Motors Corporation, Seoul (KR)

(72) Inventors: Seung-Min Oh, Incheon (KR); Yoon Sung Lee, Gyeonggi-do (KR); Jung Young Cho, Seoul (KR); Yeolmae Yeo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/579,107

(22) Filed: Sep. 23, 2019

(65) Prior Publication Data

US 2020/0176758 A1 Jun. 4, 2020

(30) Foreign Application Priority Data

Nov. 30, 2018 (KR) .......... 10-2018-0152059

(51) Int. Cl.
| | |
|---|---|
| *H01B 1/24* | (2006.01) |
| *H01M 4/133* | (2010.01) |
| *H01M 4/36* | (2006.01) |
| *H01M 4/134* | (2010.01) |
| *H01M 4/136* | (2010.01) |
| *H01M 4/38* | (2006.01) |
| *H01M 4/587* | (2010.01) |
| *H01M 4/62* | (2006.01) |
| *H01M 10/0525* | (2010.01) |

(Continued)

(52) U.S. Cl.
CPC .............. *H01M 4/364* (2013.01); *H01B 1/24* (2013.01); *H01M 4/133* (2013.01); *H01M 4/134* (2013.01); *H01M 4/136* (2013.01); *H01M 4/386* (2013.01); *H01M 4/483* (2013.01); *H01M 4/587* (2013.01); *H01M 4/625* (2013.01); *H01M 10/0525* (2013.01); *H01M 2004/027* (2013.01); *H01M 2220/20* (2013.01)

(58) Field of Classification Search
CPC ........ H01M 4/02; H01M 4/133; H01M 4/134; H01M 4/66; H01B 1/00; H01B 1/24
See application file for complete search history.

(56) References Cited

U.S. PATENT DOCUMENTS 9,666,863 B2 * 5/2017 Lu ........................... H01M 4/58
10,439,223 B1 * 10/2019 Goodman ............. C01B 32/956
10,622,632 B1 * 4/2020 Adireddy .......... H01M 10/0525

(Continued)

*Primary Examiner* — Mark Kopec
(74) *Attorney, Agent, or Firm* — Mintz Levin Cohn Ferris Glovsky and Popeo, P.C.; Peter F. Corless

(57) ABSTRACT

Provided are a silicon-based composite anode active material for a secondary battery and an anode including the same. The anode active material for a secondary battery may be a silicon-based composite anode active material, which may include a graphite and a silicon component including two or more selected from the group consisting of Si, Si-M, $SiO_x$, and SiC. The Si-M may be a silicon alloy, and the M may include at least one selected from the group consisting of a transition metal, an alkaline earth metal, a group 13 element, a group 14 element, and a rare earth element.

12 Claims, 4 Drawing Sheets

(51) Int. Cl.
*H01M 4/48* (2010.01)
*H01M 4/02* (2006.01)

(56) References Cited

U.S. PATENT DOCUMENTS

| | | | |
|---|---|---|---|
| 2013/0295454 A1* | 11/2013 | Huang | H01M 4/628 |
| | | | 429/211 |
| 2014/0264201 A1* | 9/2014 | Bouvy | B82Y 30/00 |
| | | | 252/587 |
| 2015/0017527 A1* | 1/2015 | Lee | H01M 4/0404 |
| | | | 429/213 |
| 2017/0040598 A1* | 2/2017 | Wang | H01M 10/0525 |

* cited by examiner

SILICON-BASED COMPOSITE ANODE ACTIVE MATERIAL FOR SECONDARY BATTERY, ANODE COMPRISING SAME

CROSS-REFERENCE TO RELATED APPLICATION(S)

This application claims the benefit of priority to Korean Patent Application No. 10-2018-0152059, filed on Nov. 30, 2018 in the Korean Intellectual Property Office, the entire invention of which is incorporated herein by reference.

TECHNICAL FIELD

The present invention relates to an anode active material (e.g., a silicon-based composite anode active material) for a secondary battery and an anode including the same.

BACKGROUND ART

In order to reduce environmental pollution, the automobile industry is diversified by using electric energy in addition to using fossil fuel. For example, lithium secondary batteries have been most popular as being used in a vehicle as electric energy source. In recent years, energy densification of batteries has been the most important issue to increase mileage of the vehicle. To achieve this, energy density of materials used therefor needs to be improved.

Although batteries using a Ni—Co—Mn-based or Ni—Co—Al-based cathode material and a graphite anode have been developed, materials capable of replacing these materials have been developed due to limitation of energy density. For example, silicon can provide substantially greater energy density, e.g., a capacity exceeding 4000 mAh/g, than conventional graphite (360 mAh/g).

However, when using the silicon anode, volume expansion may occur during charging/discharging processes, resulting in a volume expansion of about four times that of conventional cases when charged up to Li4.4Si. As a result, electrode tears and cracks can be generated, which deteriorates not only the lifetime of the electrode but also safety. In addition, when lithium ions are consumed at the time of initial charging, a large irreversible capacity may be generated.

SUMMARY

In preferred aspect, provided is an anode active material (e.g., silicon-based composite anode active material) for a secondary battery, and an anode including the same. The anode active material may have excellent lifetime characteristics and volume expansion inhibiting ability while maintaining a high energy density compared to a conventional silicon anode material by controlling the composition of the silicon anode material having different characteristics (e.g., silicon components).

In an aspect, provided is an anode active material (e.g., silicon-based composite anode active material) for a secondary battery. The anode active material (e.g., silicon-based composite anode active material) may include a graphite and a silicon component.

The silicon component as used herein refers to a compound or material that includes silicon (Si) as main component, and the silicon may exist in an elemental Si, silicon metal (Si-M) such as a silicon alloy, silicon oxide ($SiO_x$) or silicon carbide (SiC). The silicon component may suitably include two or more selected from the group consisting of Si, Si-M, $SiO_x$, and SiC. The Si-M may be a silicon alloy, and the M may suitably include one or more selected from the group consisting of a transition metal, an alkaline earth metal, a group 13 element, a group 14 element, and a rare earth element.

The anode active material may suitably include: the silicon component including two selected from the Si-M in an amount greater than 0 wt % and about 5 wt % or less, the $SiO_x$ in an amount greater than 0 wt % and about 11 wt % or less, and the SiC in an amount greater than 0 wt % and 20 wt % or less, and the remainder of graphite. All the wt % herein are based on the total weight of the anode active material.

The term "wt %" may be equivalently used with "% by weight", and both "wt %" and "% by weight" may be based on the total weight of a composition, e.g., total weight of the anode active material.

Moreover, the anode active material may suitably include: the silicon component including two selected from the Si-M in an amount greater than 0 wt % and about 9 wt % or less, the $SiO_x$ in an amount greater than 0 wt % and about 11 wt % or less, and the SiC in an amount greater than 0 wt % and about 35 wt % or less, and the remainder of graphite.

Alternatively, the anode active material may suitably include: the silicon component including the Si-M in an amount greater than 0 wt % and about 11 wt % or less and the SiC in an amount greater than 0 wt % and about 35 wt % or less, and the remainder of graphite.

Also, the anode active material may suitably include: the silicon component including two selected from the Si-M in an amount greater than 0 wt % and about 20 wt % or less, the $SiO_x$ in an amount greater than 0 wt % and about 20 wt % or less and the SiC in an amount greater than 0 wt % and about 60 wt % or less, and the remainder of graphite.

The graphite may suitably include natural graphite, artificial graphite, or a combination thereof.

The M may suitably include one or more selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, and Po.

In an aspect, provided is an anode (e.g., silicon-based composite anode) for a secondary battery. The anode (e.g., silicon-based composite anode) may include an anode active material (e.g., silicon-based composite anode active material) including a graphite and a silicon component comprising two or more selected from the group consisting of Si, Si-M, $SiO_x$, and SiC, and a conductive material. The Si-M may be a silicon alloy, and the M may suitably include one or more selected from the group consisting of a transition metal, an alkaline earth metal, a group 13 element, a group 14 element, and a rare earth element.

The conductive material may suitably include one or more selected from the group consisting of graphite, carbon black, CNT, graphene, and graphene oxide.

As described above, the anode active material may suitably include: the silicon component comprising two selected from the Si-M in an amount of about greater than 0 wt % and about 5 wt % or less, the $SiO_x$ in an amount greater than 0 wt % and about 11 wt % or less, and the SiC in an amount greater than 0 wt % and about 20 wt % or less, and the remainder of graphite, all wt % based on the total weight of the anode active material.

In addition, the anode active material may suitably include: the silicon component comprising two selected from the Si-M in an amount greater than 0 wt % and about 9 wt % or less, the $SiO_x$ in an amount greater than 0 wt % and of about 11 wt % or less, and SiC in an amount greater than 0 wt % and 35 wt % or less, and the remainder of graphite, all wt % based on the total weight of the anode active material.

Alternatively, the anode active material may suitably include: the silicon component comprising the Si-M in an amount greater than 0 wt % and about 11 wt % or less and the SiC in an amount greater than 0 wt % and about 35 wt % or less, and the remainder of graphite, all wt % based on the total weight of the anode active material.

Also, the anode active material may suitably include: the silicon component comprising two selected from the Si-M in an amount greater than 0 wt % and of about 20 wt % or less, the $SiO_x$, in an amount greater than 0 wt % and of about 20 wt % or less, and the SiC in an amount greater than 0 wt % and of about 60 wt % or less, and the remainder of graphite, all wt % based on the total weight of the anode active material.

The graphite may suitably include natural graphite, artificial graphite, or a combination thereof.

The M may suitably include one or more selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, and Po.

Further provided is a secondary battery including the anode described herein.

Also provided is a vehicle including the secondary battery as described herein.

According to various exemplary embodiments of the present invention, it is possible to secure excellent lifetime characteristics and volume expansion inhibiting ability as compared with a conventional silicon anode while having high energy density. Also, in accordance with an increase in an amount of graphite used as the base material, durability is improved than the same capacity composition, and the price may be reduced.

Other aspects of the invention are disclosed infra.

DETAILED DESCRIPTION

Figure 1:
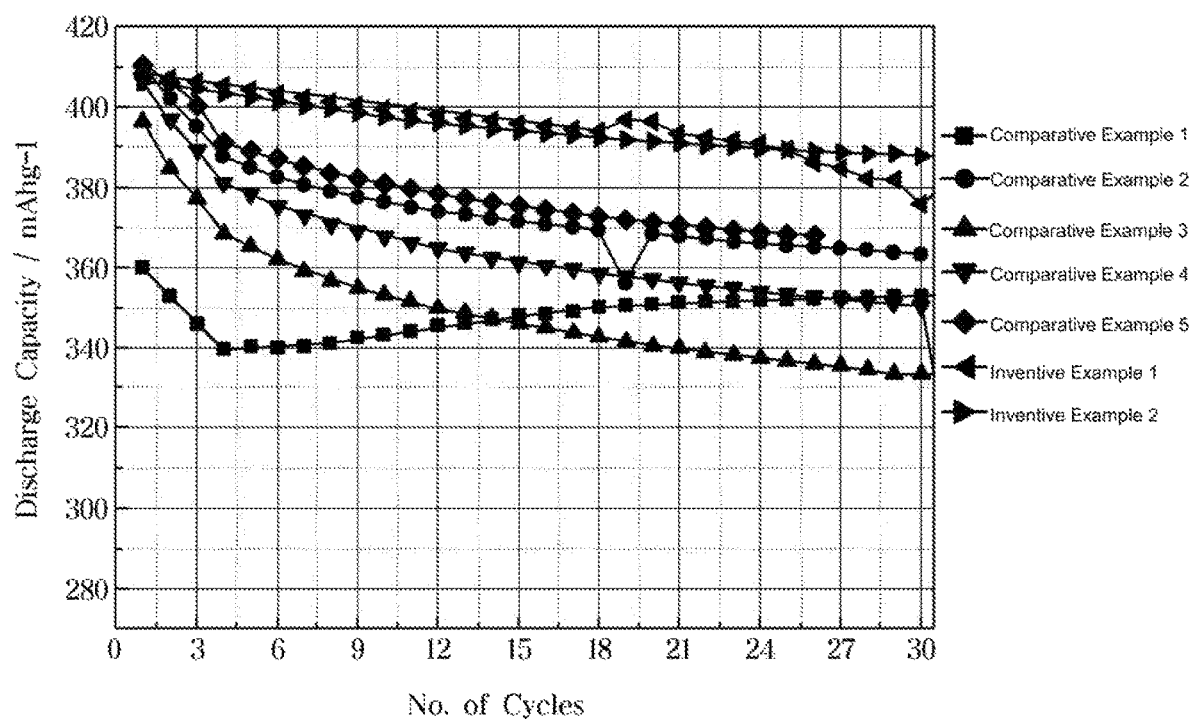
FIG. 1 is a graph for comparing lifetime characteristics of Examples 1 and 2 according to exemplary embodiments of the present invention and Comparative Examples 1 to 5.

An anode active material (e.g., silicon-based composite anode active material) for a secondary battery according to an embodiment of the present invention may include i) a graphite and ii) a silicon component including two or more selected from the group consisting of Si, Si-M, $SiO_x$, and SiC. The Si-M may preferably be silicon alloy, and the M may suitably include one or more selected from the group consisting of a transition metal, an alkaline earth metal, a group 13 element, a group 14 element, and a rare earth element.

Hereinafter, exemplary embodiments of the present invention will be described. However, the embodiments of the present invention may be modified into various other forms, and the technical idea of the present invention is not limited to the embodiments described below. Further, the embodiments of the present invention are provided to more fully explain the present invention to those skilled in the art.

The terms used in the present application are used only to illustrate specific examples. Thus, for example, the expression of the singular includes plural expressions unless the context clearly dictates otherwise. As used herein, the singular forms "a," "an" and "the" are intended to include the plural forms as well, unless the context clearly indicates otherwise.

The terms "include" or "have," and the like used in the present application are used to specifically denote the presence of stated features, steps, functions, elements, or combinations thereof and the like, and are not used to preparatorily preclude the presence of elements, steps, functions, components, or combinations thereof.

Unless defined otherwise, all terms used herein should be interpreted to have the same meaning as commonly understood by one of ordinary skill in the art to which this invention belongs. Thus, unless explicitly defined herein, certain terms should not be construed in an overly ideal or formal sense.

It should also be understood that the terms "about," "substantially," and the like in the present specification are used in the numerical value or in the vicinity of the numerical value in the meanings mentioned when inherent manufacturing and material allowable errors are presented, and are used to prevent conscienceless intruders from unreasonably using the accurate or absolute numbers, disclosed in the present invention to help understanding of the present invention. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

In the related art, a conventional silicon anode may cause the biggest problem that volume expansion occurs during the charging/discharging processes, resulting in a volume expansion of about 4 times that of a conventional case when charged up to Li4.4Si. As a result, electrode tears and cracks can be generated, which deteriorates not only the lifetime of the electrode but also safety factors. In addition, when lithium ions are consumed at the time of initial charging, a large irreversible capacity may be generated.

In order to solve the above-mentioned problems, the present invention provides an anode active material (e.g., silicon-based composite anode active material) for a secondary battery, and an anode including the same. The anode active material or the silicon-based composite anode active material may provide excellent lifetime characteristics and volume expansion inhibiting ability while maintaining a high energy density compared to a conventional silicon anode by controlling the composition of a silicon anode material having different characteristics.

A silicon-based composite anode active material for a secondary battery according to an exemplary embodiment of the present invention may include a graphite and at least two selected from the group consisting of Si, Si-M, $SiO_x$, and SiC, wherein the Si-M is a silicon alloy, and the M includes at least one selected from the group consisting of a transition metal, an alkaline earth metal, a group 13 element, a group 14 element, and a rare earth element. Hereinafter, the silicon alloy is abbreviated as Si-M.

Also, in one embodiment, the M may include at least one selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The present invention may include a graphite and two or more kinds selected from the group consisting of Si, Si-M, $SiO_x$, and SiC, having different characteristics. From this, it is possible to secure a silicon-based composite anode active material for a secondary battery having a high energy density and excellent lifetime characteristics and volume expansion inhibiting ability and an anode including the same.

In addition, according to the present invention, it is possible to control the respective composition ratios of graphite and Si, Si-M, $SiO_x$ and SiC having different characteristics. Also, when two or more kinds selected from the group consisting of Si, Si-M, $SiO_x$, and SiC are included, only the advantages of each Si, Si-M, $SiO_x$, and SiC may be expressed.

For example, when Si-M is added or included in the anode active material, the discharge efficiency may be improved, but the lifetime characteristic may be reduced.

For example, when $SiO_x$ is added or included in the anode active material, lifetime characteristics may be improved, but the discharge efficiency may be reduced.

For example, when SiC is added or included in the anode active material, it is possible to secure a volume expansion inhibiting ability, and the discharge efficiency may be improved, but the lifetime characteristics may not be sufficiently improved as compared with the case of adding Si-M.

For example, when graphite is added, durability may be improved.

Further, when each of the above compositions is listed sequentially from the silicon component having the highest energy density, Si-M, $SiO_x$, SiC, and graphite may be listed. In addition, as the silicon content is reduced, the price may be reduced and the volume expansion inhibiting ability may be improved, thereby obtaining excellent lifetime characteristics of the battery.

According to various exemplary embodiments of the present invention, desired cell characteristics may be obtained by controlling the respective composition ratios of the components as described above.

For example, composition ratios for obtaining a discharge capacity of about 410 mAh/g may include: the silicon component including two selected from the Si-M in an amount greater than 0 wt % and of about 5 wt % or less, the $SiO_x$ in an amount greater than 0 wt % and of about 11 wt % or less and the SiC in an amount greater than 0 wt % and of about 20 wt % or less, and the remainder of graphite. All the wt % are based on the total weight of the anode active material. In the above composition, the discharge efficiency of about 92.0% or greater, the lifetime characteristic (0.5 C, $30^{th}$ cycle) of about 93.5% or greater, and the expansion ratio (after $1^{st}$ cycle charging) of about 28.0% or less may be secured.

For example, a composition for obtaining a discharge capacity of about 430 mAh/g may include: the silicon component including two selected from the Si-M in an amount greater than 0 wt % and of about 9 wt % or less, the $SiO_x$ in an amount greater than 0 wt % and of about 11 wt % or less and the SiC in an amount greater than 0 wt % and of about 35 wt % or less, and the remainder of graphite. All the wt % are based on the total weight of the anode active material. In the above composition, the discharge efficiency of about 88.0% or greater, the lifetime characteristic (0.5 C, $30^{th}$ cycle) of about 93.5% or greater, and the expansion ratio (after $1^{st}$ cycle charging) of about 28.0% or less may be secured.

For example, a composition for obtaining a discharge capacity of about 450 mAh/g may include: the silicon component including the Si-M in an amount greater than 0 wt % and of about 11 wt % or less, and the SiC in an amount greater than 0 wt % and of about 35 wt % or less, and the remainder of graphite. All the wt % are based on the total weight of the anode active material. In the above composition, the discharge efficiency of about 91.0% or greater, the lifetime characteristic (0.5 C, $30^{th}$ cycle) of about 95.8% or greater, and the expansion ratio (after $1^{st}$ cycle charging) of about 28.0% or less may be secured.

For example, a composition for obtaining a discharge capacity of about 550 mAh/g may include: the silicon component including two selected from the Si-M in an amount greater than 0 wt % and of about 20 wt % or less, the $SiO_x$ in an amount greater than 0 wt % and of about 20 wt % or less and the SiC in an amount greater than 0 wt % and of about 60 wt % or less, and the remainder of graphite. All the wt % are based on the total weight of the anode active material. In the above composition, the discharge efficiency of about 80.3% or greater, the lifetime characteristic (0.5 C, $30^{th}$ cycle) of about 87.3% or greater, and the expansion ratio (after $1^{st}$ cycle charging) of about 41.7% or less may be secured.

Although the examples of the present invention have been described above, the idea of the present invention is not limited to the examples described above, and may be changed in various ways within a range that may be understood by a person skilled in the art.

In the silicon-based composite anode active material according to an exemplary embodiment of the present invention, the graphite may suitably include natural graphite, artificial graphite, or a combination thereof.

An anode (e.g., silicon-based composite anode) for a secondary battery according to an exemplary embodiment of the present invention may suitably include a silicon-based composite anode active material including a graphite and a silicon component including two or more selected from the group consisting of Si, Si-M, $SiO_x$, and SiC, and a conductive material. The Si-M may be a silicon alloy, and the M suitably include one or more selected from the group consisting of a transition metal, an alkaline earth metal, a group 13 element, a group 14 element, and a rare earth element.

Hereinafter, the description of the silicon-based composite anode active material is the same as described above and will be omitted.

According to an exemplary embodiment of the present invention, the conductive material may include suitably one selected from the group consisting of graphite, carbon black, CNT, graphene, and graphene oxide.

The anode active material (e.g., silicon-based composite anode active material) for a secondary battery, and the anode (e.g., silicon-based composite anode) including the same according to various exemplary embodiments of the present invention may have a high energy density and an excellent lifetime characteristic and a volume expansion inhibiting ability as compared to conventional silicon anodes.

Also, in accordance with an increase in an amount of graphite used as the base material, durability may be improved than the same capacity composition, and the price may be reduced.

Hereinafter, the present invention will be described more specifically by way of examples. It should be noted, however, that the following examples are intended to illustrate the invention in more detail and not to limit the scope of the invention. The scope of the present invention is determined by the matters set forth in the claims and the matters reasonably inferred therefrom.

EXAMPLE

Hereinafter, the manufacturing process of each of examples and comparative examples is briefly described, and then each of the examples and comparative examples are compared and evaluated with reference to the attached drawings.

Preparation of Example 1

An anode active material was prepared by dry-mixing 2% by weight of Si-M, 20% by weight of SiC, and the remainder of natural graphite. Then, a slurry was prepared in an aqueous system using 92% by weight of the silicon-based composite anode active material, 3% by weight of a graphite conductive material, 3% by weight of a CMC/SBR as a binder, and 2% by weight of an acrylic binder, and then an anode was prepared. Subsequently, a secondary battery using the above prepared anode was prepared.

Preparation of Example 2

A secondary battery of Invention Example 2 was fabricated in the same manner as in Example 1 except that an anode active material was prepared by dry-mixing 2% by weight of Si-M, 20% by weight of SiC, and the remainder of artificial graphite.

Preparation of Example 3

A secondary battery of Invention Example 3 was fabricated in the same manner as in Example 1 except that an anode active material was prepared by dry-mixing 3% by weight of Si-M, 27% by weight of SiC, and the remainder of natural graphite.

Preparation of Example 4

A secondary battery of Invention Example 4 was fabricated in the same manner as in Example 1 except that an anode active material was prepared by dry-mixing 3% by weight of Si-M, 27% by weight of SiC, and the remainder of artificial graphite.

Preparation of Example 5

A secondary battery of Invention Example 5 was fabricated in the same manner as in Example 1 except that an anode active material was prepared by dry-mixing 2% by weight of Si-M, 10% by weight of $SiO_x$, and the remainder of natural graphite.

Preparation of Example 6

A secondary battery of Invention Example 6 was fabricated in the same manner as in Example 1 except that an anode active material was prepared by dry-mixing 7% by weight of Si-M, 23% by weight of SiC, and the remainder of natural graphite.

Preparation of Example 7

A secondary battery of Invention Example 7 was fabricated in the same manner as in Example 1 except that an anode active material was prepared by dry-mixing 12% by weight of Si-M, 60% by weight of SiC, and the remainder of natural graphite.

Preparation of Example 8

A secondary battery of Invention Example 8 was fabricated in the same manner as in Example 1 except that an anode active material was prepared by dry-mixing 10% by weight of Si-M, 20% by weight of $SiO_x$, and the remainder of natural graphite.

Preparation of Example 9

A secondary battery of Invention Example 9 was fabricated in the same manner as in Example 1 except that an anode active material was prepared by dry-mixing 55% by weight of SiC, 20% by weight of $SiO_x$, and the remainder of natural graphite.

Preparation of Comparative Example 1

A secondary battery of Comparative Example 1 was fabricated in the same manner as in Example 1 except that an anode active material was prepared by dry-mixing only graphite.

Preparation of Comparative Example 2

A secondary battery of Comparative Example 2 was fabricated in the same manner as in Example 1 except that an anode active material was prepared by dry-mixing 5% by weight of Si-M and the remainder of natural graphite.

Preparation of Comparative Example 3

A secondary battery of Comparative Example 3 was fabricated in the same manner as in Example 1 except that an anode active material was prepared by dry-mixing 5% by weight of Si-M and the remainder of artificial graphite.

Preparation of Comparative Example 4

A secondary battery of Comparative Example 4 was fabricated in the same manner as in Example 1 except that an anode active material was prepared by dry-mixing 5% by weight of Si-M, 28% by weight of artificial graphite, and the remainder of natural graphite.

Preparation of Comparative Example 5

A secondary battery of Comparative Example 5 was fabricated in the same manner as in Example 1 except that an anode active material was prepared by dry-mixing 35% by weight of SiC and the remainder of natural graphite.

Preparation of Comparative Example 6

A secondary battery of Comparative Example 6 was fabricated in the same manner as in Example 1 except that an anode active material was prepared by dry-mixing 8% by weight of Si-M and the remainder of natural graphite.

Preparation of Comparative Example 7

A secondary battery of Comparative Example 7 was fabricated in the same manner as in Example 1 except that an anode active material was prepared by dry-mixing 11% by weight of $SiO_x$ and the remainder of natural graphite.

Preparation of Comparative Example 8

A secondary battery of Comparative Example 8 was fabricated in the same manner as in Example 1 except that an anode active material was prepared by dry-mixing 10% by weight of Si-M and the remainder of natural graphite.

Preparation of Comparative Example 9

A secondary battery of Comparative Example 9 was fabricated in the same manner as in Example 1 except that an anode active material was prepared by dry-mixing 20% by weight of Si-M and the remainder of natural graphite.

Preparation of Comparative Example 10

A secondary battery of Comparative Example 10 was fabricated in the same manner as in Example 1 except that an anode active material was prepared by dry-mixing 85% by weight of SiC and the remainder of natural graphite.

<Evaluation>

In the present specification, the examples and comparative examples were prepared by controlling the compositions to produce the anode active materials based on the discharge capacity. Hereinafter, the battery characteristics of each of the examples and comparative examples were evaluated based on the discharge capacity.

(1) Discharge Capacity of 410 mAh/g

The discharge capacities (mAh/g), discharge efficiencies (%), lifetime characteristics (0.5 C, $30^{th}$ cycle), and expansion ratios (after $1^{st}$ cycle charging) of Comparative Examples 1 to 5 and Examples 1 and 2 whose compositions ratios were controlled to have a discharge capacity of about 410 mAh/g are shown in Table 1 below. In Table 1, the lifetime characteristic (0.5 C) is a value obtained by measuring the ratio (%) of the discharge capacity in the $30^{th}$ cycle to the initial discharge capacity in each of the comparative examples and the examples.

FIG. 1 is a graph for comparing lifetime characteristics of Examples 1 and 2 and Comparative Examples 1 to 5, and is a graph of change in discharge capacity according to the number of cycles.

TABLE 1

| | Discharge Capacity (mAh/g) | Discharge Efficiency (%) | Lifetime Characteristic (%) | Expansion Ratio (%) |
|---|---|---|---|---|
| Comparative Example 1 | 360 | 90.4 | 100.0 | 17.0 |
| Comparative Example 2 | 410 | 90.5 | 94.7 | 28.5 |
| Comparative Example 3 | 397 | 90.8 | 90.4 | 37.5 |
| Comparative Example 4 | 410 | 90.8 | 91.9 | 29.3 |
| Comparative Example 5 | 410 | 89.3 | 94.5 | 29.1 |
| Example 1 | 408.5 | 92.0 | 93.5 | 25.0 |
| Example 2 | 393.6 | 92.6 | 95.9 | 28.0 |

Hereinafter, each of the examples and comparative examples will be comparatively evaluated with reference to Table 1 and FIG. 1.

As shown in Table 1, the discharge capacities of Examples 1 and 2 were respectively 408.5 mAh/g and 393.6 mAh/g, indicating sufficient discharge capacities of about 410 mAh/g. At the same time, discharge efficiencies of 92.0% or greater, lifetime characteristics (0.5 C, $30^{th}$ cycle) of 93.5% or greater, and expansion ratios (after $1^{st}$ cycle charging) of 28.0% or less may be secured.

On the other hand, in the case of Comparative Example 1 using only the graphite, the discharge capacity of 410 mAh/g could not be attained, low discharge capacity of 360 mAh/g was attained.

In the case of Comparative Example 2, it may be seen that the discharge efficiency was lower than that in Examples 1 and 2.

In the case of Comparative Examples 3, 4 and 5, it may be seen that the discharge efficiencies were less, the lifetime characteristics were lower and the expansion ratios were greater, than those in Examples 1 and 2.

In particular, referring to FIG. 1, in the case of Examples 1 and 2, the discharge capacities according to the number of cycles were not considerably changed as compared with that at the beginning, and it may be visually seen that the discharge capacities were stably maintained compared to Comparative Examples 1 to 5.

As described above, it may be seen that the optimized composition of the silicon-based composite anode active material for securing the discharge capacity of 410 mAh/g in consideration of the lifetime characteristics, the expansion ratios, and the discharge efficiencies is as follows: the silicon component including two selected from Si-M in an amount greater than 0 wt % and 5 wt % or less, $SiO_x$ in an amount greater than 0 wt % and of about 11 wt % or less, and SiC in an amount greater than 0 wt % and 20 wt % or less, and the remainder of graphite, based on the total weight of the anode active material.

(2) Discharge Capacity of 430 mAh/g

The discharge capacities (mAh/g), discharge efficiencies (%), lifetime characteristics (0.5 C, $30^{th}$ cycle), and expansion ratios (after $1^{st}$ cycle charging) of Comparative Examples 1, 6 and 7, and Examples 3 to 5 whose compositions ratios were controlled to have a discharge capacity of about 430 mAh/g are shown in Table 2 below. In Table 2, the lifetime characteristic (0.5 C) is a value obtained by measuring the ratio (%) of the discharge capacity in the $30^{th}$ cycle to the initial discharge capacity in each of the comparative example and the examples.

Figure 2:
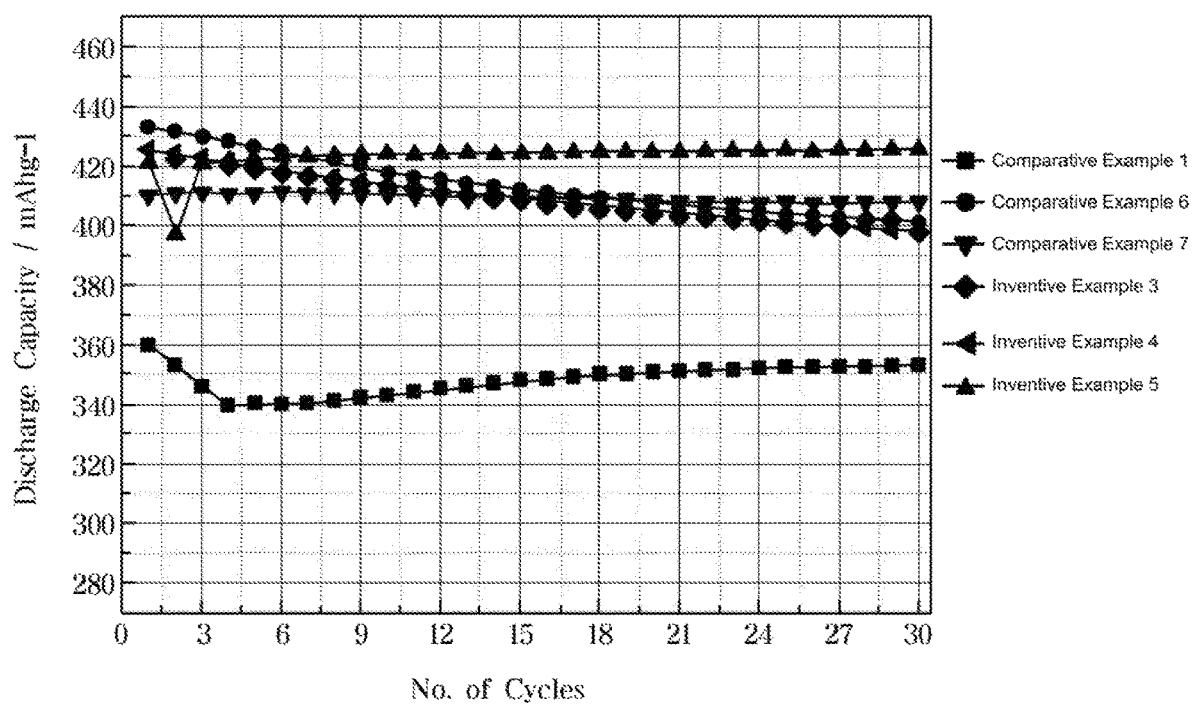
FIG. 2 is a graph for comparing lifetime characteristics of Examples 3 to 5 according to exemplary embodiments of the present invention and Comparative Examples 1, 6, and 7.

FIG. 2 is a graph for comparing lifetime characteristics of Examples 3 to 5, and Comparative Examples 1, 6 and 7, and is a graph of change in discharge capacity according to the number of cycles.

TABLE 2

|  | Discharge Capacity (mAh/g) | Discharge Efficiency (%) | Lifetime Characteristic (%) | Expansion Ratio (%) |
|---|---|---|---|---|
| Comparative Example 1 | 360 | 90.4 | 100.0 | 17.0 |
| Comparative Example 6 | 433 | 91.5 | 92.6 | 30.0 |
| Comparative Example 7 | 410.2 | 84.9 | 99.4 | 29.0 |
| Example 3 | 423.1 | 91.5 | 94.0 | 28.0 |
| Example 4 | 425.8 | 92.2 | 93.5 | 27.0 |
| Example 5 | 421.6 | 88.0 | 100.8 | 28.0 |

Hereinafter, each of the examples and comparative examples will be comparatively evaluated with reference to Table 2 and FIG. 2.

As shown in Table 2, the discharge capacities of Examples 3 to 5 were respectively 423.1 mAh/g, 425.8 mAh/g and 421.6 mAh/g indicating sufficient discharge capacities greater than the discharge capacity of about 430 mAh/g. At the same time, discharge efficiency of 88.0% or greater, lifetime characteristics (0.5 C, $30^{th}$ cycle) of 93.5% or greater, and expansion ratios (after $1^{st}$ cycle charging) of 28.0% or less were obtained.

On the other hand, in the case of Comparative Example 1, only the graphite was used so that the discharge capacity of 430 mAh/g could not be attained, and a low discharge capacity of 360 mAh/g was obtained.

In the case of Comparative Example 6, it may be seen that the life characteristic was lower and the expansion ratio was higher, than those according to Examples 3 to 5.

In the case of Comparative Example 7, the discharge capacity of 430 mAh/g could not be attained and low discharge capacity of 410 mAh/g was attained. It may be seen that the discharge efficiency was lower, the life characteristic was lower, than those in Examples 3 to 5.

In particular, as shown in FIG. 2, in the case of Examples 3 to 5, the discharge capacity according to the number of cycles is not largely changed as compared with that at the beginning, and it may be visually seen that the discharge capacity is well maintained compared to Comparative Examples 1, 6 and 7.

As described above, it may be seen that the optimized composition of the silicon-based composite anode active material for securing the discharge capacity of 430 mAh/g in consideration of the lifetime characteristics, the expansion ratios, and the discharge efficiencies is as follows: a silicon component including two selected from Si-M in an amount greater than 0 wt % and of about 9% or less, $SiO_x$ in an amount greater than 0 wt % and of about 11 wt % or less, and SiC in an amount greater 0 wt % and of about 35 wt % or less, and the remainder of graphite, based on the total weight of the anode active material.

(3) Discharge Capacity of 450 mAh/g

The discharge capacities (mAh/g), discharge efficiencies (%), lifetime characteristics (0.5 C, $30^{th}$ cycle), and expansion ratios (after $1^{st}$ cycle charging) of Comparative Examples 1 and 8 and Example 6 whose composition ratios were controlled to have a discharge capacity of about 450 mAh/g are shown in Table 3 below. In Table 3, the lifetime characteristic (0.5 C) is a value obtained by measuring the ratio (%) of the discharge capacity in the $30^{th}$ cycle to the initial discharge capacity in each of the comparative examples and the Example.

Figure 3:
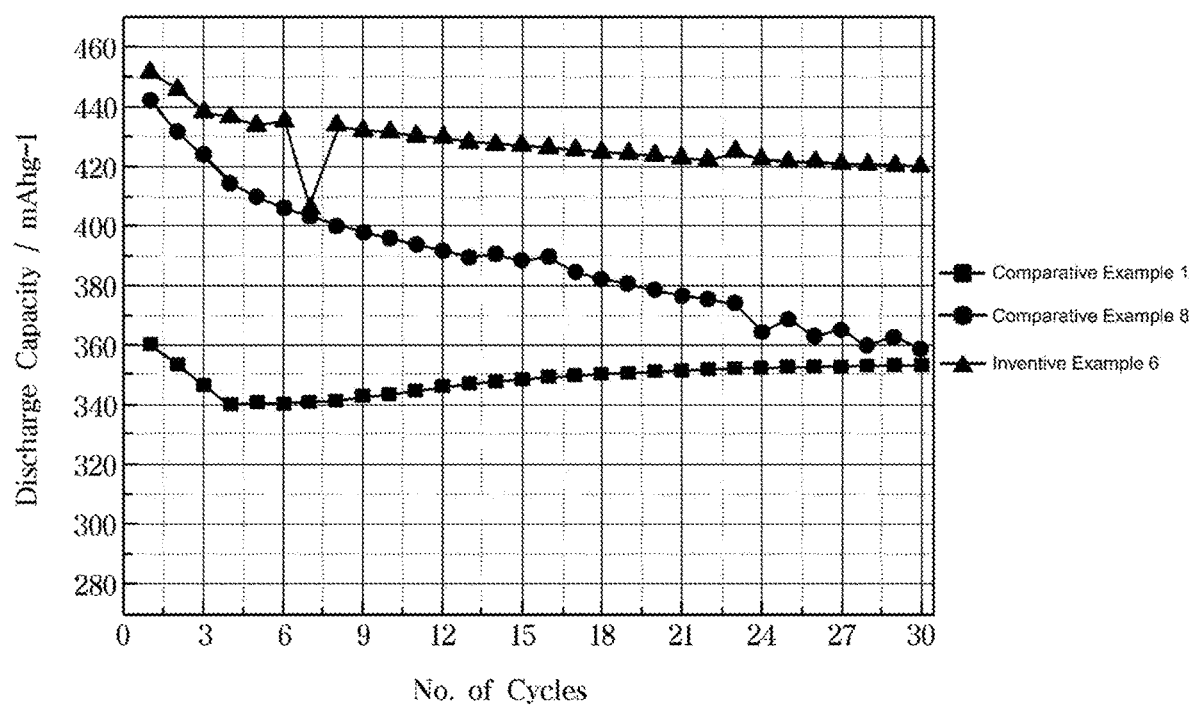
FIG. 3 is a graph for comparing lifetime characteristics of Example 6 according to exemplary embodiments of the present invention and Comparative Examples 1 and 8.

FIG. 3 is a graph for comparing lifetime characteristics of Example 6, and Comparative Examples 1 and 8, and is a graph of change in discharge capacity according to the number of cycles.

TABLE 3

|  | Discharge Capacity (mAh/g) | Discharge Efficiency (%) | Lifetime Characteristic (%) | Expansion Ratio (%) |
|---|---|---|---|---|
| Comparative Example 1 | 360 | 90.4 | 100.0 | 17.0 |
| Comparative Example 8 | 441.8 | 92.1 | 90.6 | 28.8 |
| Example 6 | 451.1 | 91.0 | 95.8 | 28.0 |

Hereinafter, each of the examples and comparative examples will be comparatively evaluated with reference to Table 3 and FIG. 3.

As shown in Table 3, the discharge capacity of Example 6 was 451.1 mAh/g indicating a sufficient discharge capacity of about 450 mAh/g. At the same time, discharge efficiencies of 91.0% or greater, lifetime characteristics (0.5 C, $30^{th}$ cycle) of 95.8% or greater, and expansion ratios (after $1^{st}$ cycle charging) of 28.0% or less may be secured.

On the other hand, in the case of Comparative Example 1 using only graphite, the discharge capacity of 450 mAh/g could not be attained, and a low discharge capacity of 360 mAh/g was attained.

In the case of Comparative Example 8, it may be seen that the discharge efficiency was lower than that in Example 6.

In particular, as shown in FIG. 3, in the case of Example 6, the discharge capacity according to the number of cycles is not largely changed as compared with that at the beginning, and it may be visually seen that the discharge capacity is stably maintained compared to Comparative Examples 1 and 8.

As described above, it may be seen that the optimized composition of the silicon-based composite anode active material for securing the discharge capacity of 450 mAh/g in consideration of the lifetime characteristics, the expansion ratios, and the discharge efficiencies is as follows: a silicon component including Si-M in an amount greater than 0 wt % and of about 11 wt % or less, and $SiO_x$ in an amount greater than 0 wt % and of about 35 wt % or less, and the remainder of graphite, based on the total weight of the anode active material.

(4) Discharge Capacity of 550 mAh/g

The discharge capacities (mAh/g), discharge efficiencies (%), lifetime characteristics (0.5 C, $30^{th}$ cycle), and expansion ratios (after $1^{st}$ cycle charging) of Comparative Examples 1, 9 and 10, and Examples 7 to 9 whose composition ratios were controlled to have a discharge capacity of about 550 mAh/g are shown in Table 4 below. In Table 4, the lifetime characteristic (0.5 C) is a value obtained by measuring the ratio (%) of the discharge capacity in the $30^{th}$ cycle to the initial discharge capacity in each of the comparative examples and the examples.

Figure 4:
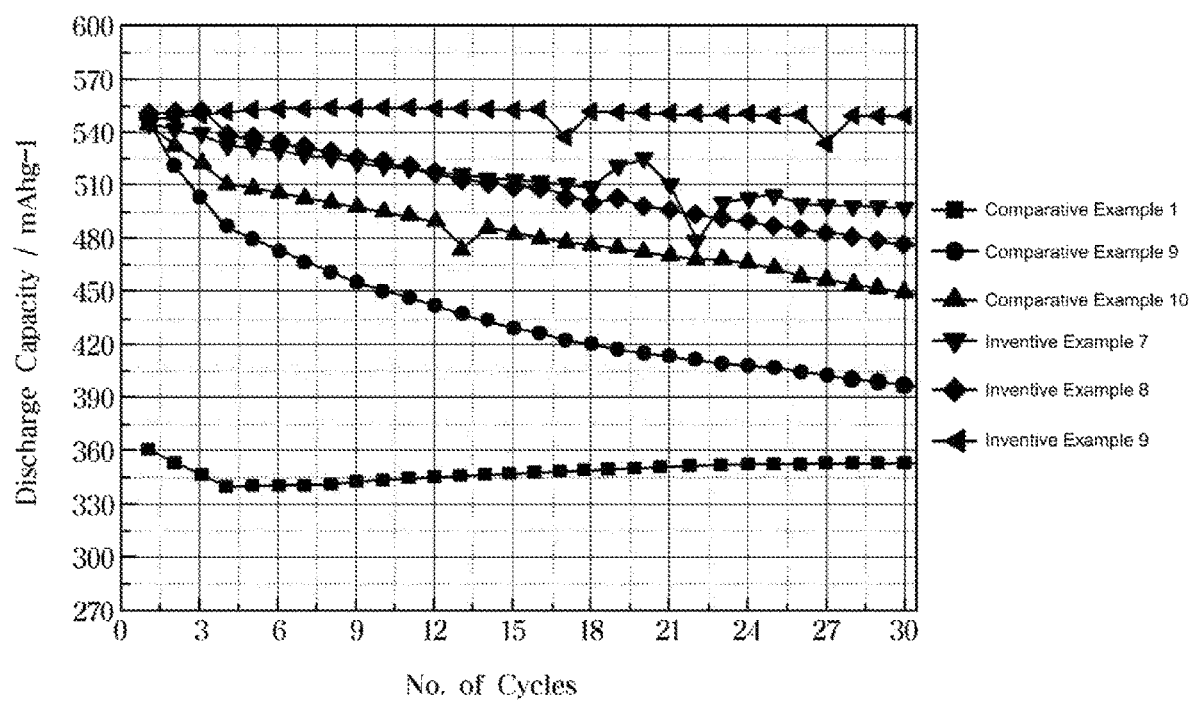
FIG. 4 is a graph for comparing lifetime characteristics of Examples 7 to 9 according to exemplary embodiments of the present invention and Comparative Examples 1, 9 and 10.

FIG. 4 is a graph for comparing lifetime characteristics of Examples 7 to 9, and Comparative Examples 1, 9 and 10, and is a graph of change in discharge capacity according to the number of cycles.

TABLE 4

| | Discharge Capacity (mAh/g) | Discharge Efficiency (%) | Lifetime Characteristic (%) | Expansion Ratio (%) |
|---|---|---|---|---|
| Comparative Example 1 | 360 | 90.4 | 100.0 | 17.0 |
| Comparative Example 9 | 545.5 | 87.3 | 80.4 | 46.0 |
| Comparative Example 10 | 544.3 | 87.1 | 86.9 | 44.0 |
| Example 7 | 545.3 | 89.8 | 89.3 | 41.7 |
| Example 8 | 550.8 | 81.5 | 87.3 | 36.0 |
| Example 9 | 547.8 | 80.3 | 102.7 | 33.8 |

Hereinafter, each of the examples and comparative examples will be comparatively evaluated with reference to Table 4 and FIG. 4.

As shown in Table 4, the discharge capacities of Examples 7 to 9 were respectively 545.3 mAh/g, 550.8 mAh/g and 547.8 mAh/g, indicating sufficient discharge capacities of about 550 mAh/g. At the same time, discharge efficiencies of 80.3% or greater, lifetime characteristics (0.5 C, $30^{th}$ cycle) of 87.3% or greater, and expansion ratios (after $1^{st}$ cycle charging) of 41.7% or less may be secured.

On the other hand, in the case of Comparative Example 1 using only the graphite, the discharge capacity of 550 mAh/g could not be attained, low discharge capacity of 360 mAh/g was attained.

In the case of Comparative Examples 9 and 10, it may be seen that the lifetime characteristics were lower, and the expansion ratios were higher, than those in Examples 7 to 9.

In particular, as shown in FIG. 4, in the case of Examples 7 to 9, the discharge capacity according to the number of cycles is not largely changed as compared with that at the beginning, and it may be visually seen that the discharge capacity is well maintained compared to Comparative Examples 1, 9 and 10.

As described above, it may be seen that the optimized composition for silicon-based composite anode active material for securing the discharge capacity of 550 mAh/g in consideration of the lifetime characteristics, the expansion ratios, and the discharge efficiencies is as follows: a silicon component including two selected from Si-M in an amount greater than 0 wt % and of 20 wt % or less, $SiO_x$ in an amount greater than 0 wt % and of about 20 wt % or less, and SiC in an amount greater than 0 wt % and of about 60 wt % or less, and the remainder of graphite, based on the total weight of the anode active material.

From the above, it may be seen that according to various exemplary embodiments of the present invention, it is possible to secure an excellent lifetime characteristic and a volume expansion inhibiting ability as compared with a conventional silicon anode while securing a high energy density.

Also, it may be seen that accordance with graphite used as the base material increase, durability may be improved than the same capacity composition, and the price may be reduced.

The exemplary embodiments disclosed with reference to the accompanying drawings and tables have been described above. It will be understood by those of ordinary skill in the art that various changes in form and details may be made therein without departing from the idea and scope of the present invention as defined by the following claims. The exemplary embodiments are illustrative and should not be construed as limiting.

What is claimed is:

1. An anode active material for a secondary battery comprising:
   a graphite; and
   a silicon component comprising two or more selected from the group consisting of Si-M, $SiO_x$, and SiC, wherein the Si-M is a silicon alloy, and the M comprises one or more selected from the group consisting of a transition metal, an alkaline earth metal, a group 13 element, a group 14 element, and a rare earth element,
   wherein the silicon component comprises two selected from the Si-M in an amount greater than 0 wt % and of about 20 wt % or less, the $SiO_x$ in an amount greater than 0 wt % and of about 20 wt % or less, and the SiC in an amount greater than 0 wt % and of about 60 wt % or less, all wt % based on the total weight of the anode active material.

2. The anode active material according to claim 1, wherein the anode active material comprises:
   the silicon component comprising two selected from the Si-M in an amount greater than 0 wt % and of about 5 wt % or less, the $SiO_x$ in an amount greater than 0 wt % and of about 11 wt % or less, and the SiC in an amount greater than 0 wt % and of about 20 wt % or less, and
   the remainder of graphite,
   all wt % based on the total weight of the anode active material.

3. The anode active material according to claim 1, wherein the anode active material comprises:
   the silicon component comprising two selected from the Si-M in an amount greater than 0 wt % and of about 9 wt % or less, the $SiO_x$ in an amount greater than 0 wt % and of about 11 wt % or less, and SiC in an amount greater than 0 wt % and of about 35 wt % or less, and
   the remainder of graphite,
   all wt % based on the total weight of the anode active material.

4. The anode active material according to claim 1, wherein the anode active material comprises:
   the silicon component comprising the Si-M in an amount greater than 0 wt % and of about 11 wt % or less and the SiC in an amount greater than 0 wt % and about 35 wt % or less, and
   the remainder of graphite
   all wt % based on the total weight of the anode active material.

5. The anode active material according to claim 1, wherein the graphite comprises natural graphite, artificial graphite, or a combination thereof.

6. The anode active material according to claim 1, wherein the M comprises one or more selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, and Po.

7. An anode for a secondary battery comprising:
   an anode active material comprising a graphite component and a silicon component comprising two or more selected from the group consisting of Si-M, $SiO_x$, SiC, or a combination thereof, wherein the Si-M is a silicon alloy, and the M comprises at least one selected from the group consisting of a transition metal, an alkaline earth metal, a group 13 element, a group 14 element, a rare earth element, or a combination thereof; and a conductive material comprising one or more selected from the group consisting of natural graphite, artificial graphite, carbon black, CNT, graphene, and graphene oxide, wherein the silicon component comprises two selected from the Si-M in an amount greater than 0 wt % and of about 20 wt % or less, the $SiO_x$ in an amount greater then 0 wt % and of about 20 wt % or less, and the SiC in an amount greater than 0 wt % and of about 60 wt % or less, all wt % based on the total weight of the anode active material.

8. The anode according to claim 7, wherein the anode active material comprises:

the silicon component comprising two selected from the Si-M in an amount greater than 0 wt % and of about 5 wt % or less, the $SiO_x$ in an amount greater than 0 wt % and of about 11 wt % or less, and the SiC in an amount greater than 0 wt % and of about 20 wt % or less, and the remainder of graphite, all wt % based on the total weight of the anode active material.

9. The anode according to claim 7, wherein the anode active material comprises:

the silicon component comprising two selected from the Si-M in an amount greater than 0 wt % and of about 9 wt % or less, the $SiO_x$ in an amount greater than 0 wt % and of about 11 wt % or less, and SiC in an amount greater than 0 wt % and of about 35 wt % or less, and the remainder of graphite, all wt % based on the total weight of the anode active material.

10. The anode according to claim 7, wherein the anode active material comprises:

the silicon component comprising the Si-M in an amount greater than 0 wt % and of about 11 wt % or less and the SiC in an amount greater than 0 wt % and of about 35 wt % or less, and the remainder of graphite, all wt % based on the total weight of the anode active material.

11. The anode according to claim 7, wherein the graphite component comprises natural graphite, artificial graphite, or a combination thereof.

12. The anode according to claim 7, wherein the M comprises one or more selected from the group consisting of Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, and Po.

* * * * *